United States Patent
Park et al.

(10) Patent No.: US 11,139,113 B2
(45) Date of Patent: Oct. 5, 2021

(54) ELECTRONIC COMPONENT

(71) Applicant: SAMSUNG ELECTRO-MECHANICS CO., LTD., Suwon-si (KR)

(72) Inventors: Heung Kil Park, Suwon-si (KR); Gu Won Ji, Suwon-si (KR); Se Hun Park, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 62 days.

(21) Appl. No.: 16/193,508

(22) Filed: Nov. 16, 2018

(65) Prior Publication Data
US 2019/0341189 A1   Nov. 7, 2019

(30) Foreign Application Priority Data

May 4, 2018  (KR) .................. 10-2018-0051916

(51) Int. Cl.
*H01G 4/248* (2006.01)
*H01G 4/30* (2006.01)
*H01G 4/232* (2006.01)
*H01G 4/008* (2006.01)
*H01G 4/12* (2006.01)

(52) U.S. Cl.
CPC ............ *H01G 4/248* (2013.01); *H01G 4/008* (2013.01); *H01G 4/2325* (2013.01); *H01G 4/30* (2013.01); *H01G 4/1227* (2013.01)

(58) Field of Classification Search
CPC ............ H01G 4/30; H01G 4/232; H01G 4/12; H01G 2/065; H01G 4/248; H01G 4/2325; H01G 4/008; H05K 1/181
USPC ............ 361/301.4, 308.1, 306.3, 321.3, 303
See application file for complete search history.

(56) References Cited

U.S. PATENT DOCUMENTS

| | | | | |
|---|---|---|---|---|
| 2013/0284507 | A1* | 10/2013 | Hattori | H05K 1/181 174/260 |
| 2014/0016242 | A1 | 1/2014 | Hattori et al. | |
| 2014/0041913 | A1* | 2/2014 | Yanagida | H01G 4/30 174/260 |
| 2014/0041914 | A1 | 2/2014 | Hattori et al. | |
| 2015/0270065 | A1* | 9/2015 | Hattori | H01G 2/065 174/255 |
| 2016/0118190 | A1* | 4/2016 | Park | H01G 2/06 174/260 |
| 2017/0034914 | A1* | 2/2017 | Nakanishi | H03H 9/09 |

FOREIGN PATENT DOCUMENTS

| | | |
|---|---|---|
| JP | 2012-204572 A | 10/2012 |
| JP | 5888281 B2 | 3/2016 |
| KR | 10-2015-0127965 A | 11/2015 |

\* cited by examiner

*Primary Examiner* — Arun Ramaswamy
(74) *Attorney, Agent, or Firm* — Morgan, Lewis & Bockius LLP

(57) ABSTRACT

An electronic component includes: a capacitor body; first and second external electrodes disposed on both ends of the capacitor body in a length direction; and first and second connection terminals disposed on a mounting surface of the capacitor body and electrically connected to the first and second external electrodes, respectively, and having first and second cut portions on surfaces facing each other in the length direction of the capacitor body, respectively.

9 Claims, 4 Drawing Sheets

ELECTRONIC COMPONENT

CROSS-REFERENCE TO RELATED APPLICATION(S)

This application claims benefit of priority to Korean Patent Application No. 10-2018-0051916 filed on May 4, 2018 in the Korean Intellectual Property Office, the disclosure of which is incorporated herein by reference in its entirety.

TECHNICAL FIELD

The present disclosure relates to an electronic component.

BACKGROUND

In recent electronic devices, as attempts to reduce the noise of equipment components has been ongoing, acoustic noise generated in a multilayer ceramic capacitor (MLCC) may become more prominent.

Since a dielectric material of a multilayer capacitor has piezoelectric properties, the multilayer ceramic capacitor may be synchronized with an applied voltage to thereby be deformed.

When a period of the applied voltage is within an audio frequency band, the displacement may become vibrations to thereby be transferred to a board through solders, and vibrations of the board may be experienced as sound. This sound, known as acoustic noise, is a problem in electronic devices.

The acoustic noise problem is that when an operating environment of a device is quiet, a user may experience acoustic noise as abnormal noise and may believe that a device is faulty, or when acoustic noise overlaps an audio output in a device having an audio circuit, quality of the device may be deteriorated.

Further, separately from acoustic noise recognized by the human ear, when piezoelectric vibrations of the multilayer capacitor are generated in a high frequency region of 20 kHz or more, the piezoelectric vibrations may cause malfunctioning of various sensors used in information technology (IT) and industrial/electric fields.

SUMMARY

An aspect of the present disclosure may provide an electronic component capable of decreasing acoustic noise in an audio frequency region of 20 kHz or less and high frequency vibrations of 20 kHz or more, and a board having the same.

According to an aspect of the present disclosure, an electronic component may include: a capacitor body; first and second external electrodes disposed on both ends of the capacitor body in a length direction; and first and second connection terminals disposed on a mounting surface of the capacitor body and connected to the first and second external electrodes, respectively, and having first and second cut portions on surfaces facing each other in the length direction of the capacitor body, respectively.

A third cut portion may be further provided in one or more outer corners of the first connection terminal, and a fourth cut portion may be further provided in one or more outer corners of the second connection terminal.

One or more fifth and sixth cut portions may be further provided in surfaces of the first and second connection terminals opposing each other in the length direction of the capacitor body, respectively.

First and second solder accommodating portions may be provided on the first and second external electrodes toward the mounting surface of the capacitor body by the first and second cut portions, respectively.

The first and second connection terminals may be formed of a metal.

The first connection terminal may be formed of an insulating material and include a first land pattern formed on a surface of the first connection terminal facing the first external electrode, a second land pattern formed on a surface thereof opposing the first land pattern, and a first conductive pattern formed on at least a portion of a surface thereof connecting the first and second land patterns to each other and electrically connecting the first and second land patterns to each other, and the second connection terminal may be formed of the insulating material and include a third land pattern formed on a surface of the second connection terminal facing the second external electrode, a fourth land pattern formed on a surface thereof opposing the third land pattern, and a second conductive pattern formed on at least a portion of a surface thereof connecting the third and fourth land patterns to each other and electrically connecting the third and fourth land patterns to each other.

The electronic component may further include plating layers formed on surfaces of the first and second external electrodes.

The electronic component may further include plating layers formed on surfaces of the first and second connection terminals.

The capacitor body may include a plurality of dielectric layers and a plurality of first and second internal electrodes alternately disposed with respective dielectric layers interposed therebetween and has first and second surfaces opposing each other and third and fourth surfaces connected to the first and second surfaces and opposing each other in the length direction, and one ends of the first and second internal electrodes may be exposed to the third and fourth surfaces of the capacitor body, respectively.

The first and second external electrodes may respectively include: first and second connection portions disposed on the third and fourth surfaces of the capacitor body, respectively, and first and second band portions extending from the first and second connection portions to portions of the first surface of the capacitor body and connected to the first and second connection terminals, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
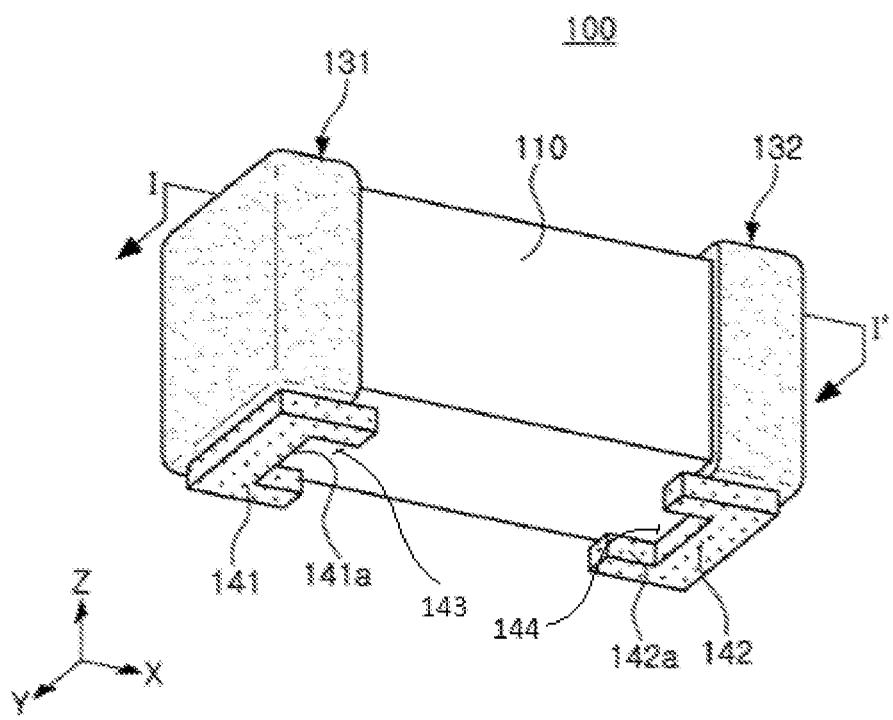
FIG. 1 is a perspective view schematically illustrating an electronic component according to an exemplary embodiment in the present disclosure.
Figure 2:
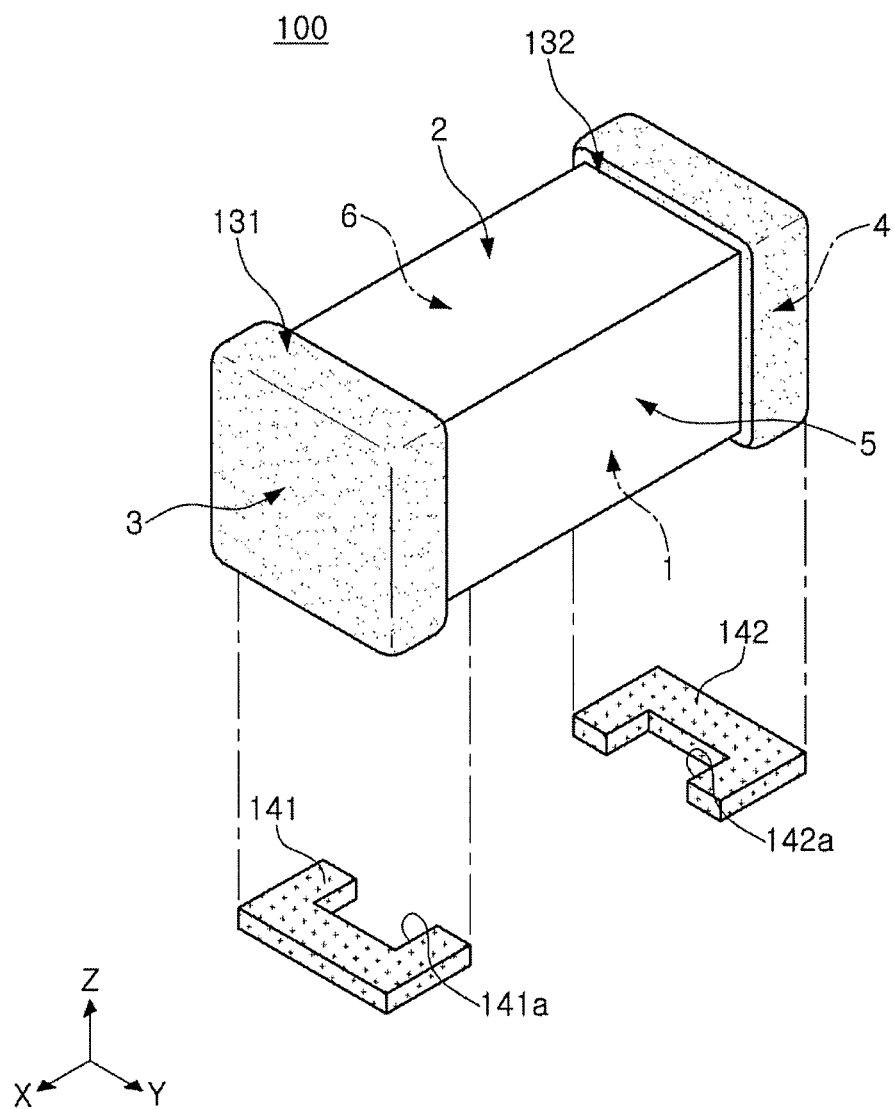
FIG. 2 is an exploded perspective view of FIG. 1.
Figure 3A:
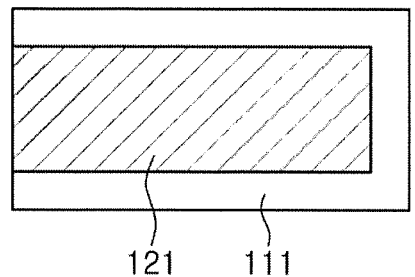
FIGS. 3A and 3B are plan views illustrating first and second internal electrodes of the electronic component according to the exemplary embodiment in the present disclosure, respectively.
Figure 3B:
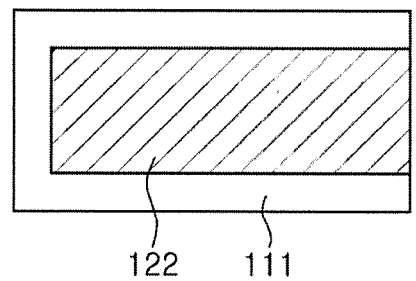
Figure 4:
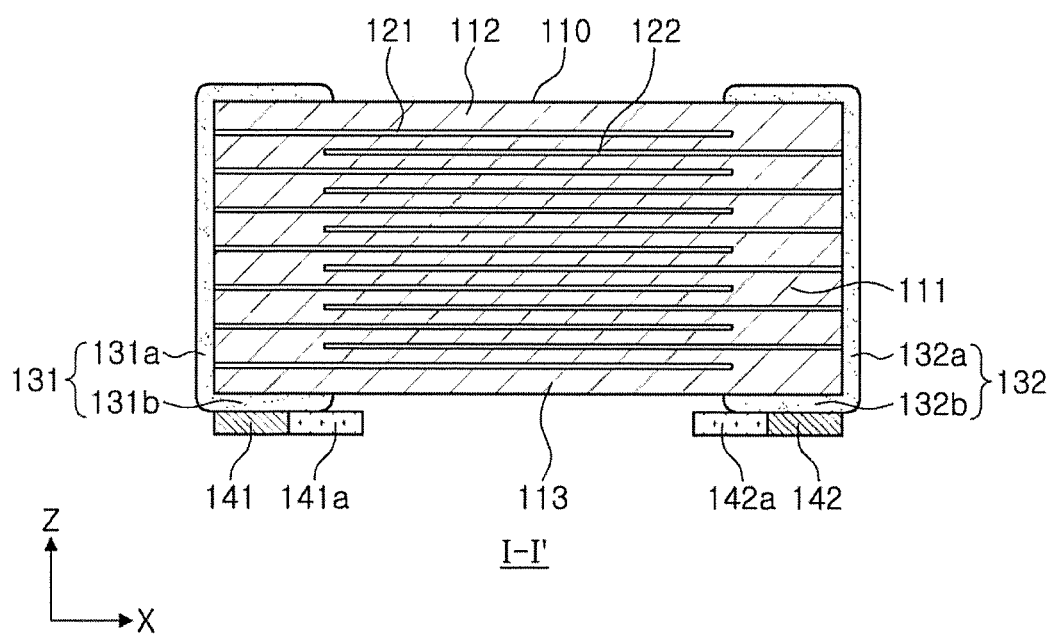
FIG. 4 is a cross-sectional view taken along line I-I' of FIG. 1.

FIG. 1 is a perspective view schematically illustrating an electronic component according to an exemplary embodiment in the present disclosure, FIG. 2 is an exploded perspective view of FIG. 1, FIGS. 3A and 3B are plan views illustrating first and second internal electrodes of the electronic component according to the exemplary embodiment in the present disclosure, respectively, and FIG. 4 is a cross-sectional view taken along line I-I' of FIG. 1.

Hereinafter, directions of a capacitor body 110 will be defined in order to clearly describe exemplary embodiments in the present disclosure. X, Y, and Z illustrated in the accompanying drawings refer to a length direction, a width direction, and a thickness direction of the capacitor body 110, respectively. Here, in the present exemplary embodiment, the Z direction may be the same as a stacking direction in which dielectric layers are stacked.

Referring to FIGS. 1 through 4, an electronic component 100 according to the exemplary embodiment in the present disclosure may include the capacitor body 110, first and second external electrodes 131 and 132 formed on both ends of the capacitor body 110 in the X direction, and first and second connection terminals 141 and 142 having first and second cut portions 141a and 142a, respectively.

The capacitor body 110 may be formed by stacking a plurality of dielectric layers 111 in the Z direction and sintering the stacked dielectric layers, and include the plurality of dielectric layers ill and first and second internal electrodes 121 and 122 alternately disposed with respective dielectric layers 111 interposed therebetween in the Z direction.

In addition, if necessary, covers 112 and 113 having a predetermined thickness may be formed on both sides of the capacitor body in the Z direction, respectively.

Here, respective adjacent dielectric layers ill of the capacitor body 110 may be integrated with each other so that boundaries therebetween are not readily apparent.

The capacitor body 110 may have an approximately hexahedral shape. However, a shape of the capacitor body 110 is not limited thereto.

In the present disclosure, for convenience of explanation, both surfaces of the capacitor body 110 opposing each other in the Z direction may be defined first and second surfaces 1 and 2, both surfaces of the capacitor body 110 connected to the first and second surfaces 1 and 2 and opposing each other in the X direction may be defined as third and fourth surfaces 3 and 4, and both surfaces of the capacitor body 110 connected to the first and second surfaces 1 and 2 and the third and fourth surfaces 3 and 4 and opposing each other in the Y direction may be defined as fifth and sixth surfaces 5 and 6. In the present exemplary embodiment, the first surface 1 of the capacitor body may be a mounting surface.

The dielectric layer 111 may contain a ceramic material having high permittivity, for example, a barium titanate ($BaTiO_3$) based ceramic powder, or the like. However, the material of the dielectric layer is not limited thereto.

In addition, the dielectric layer 111 may further contain a ceramic additive, an organic solvent, a plasticizer, a binder, a dispersant, and the like, in addition to the ceramic powder.

As the ceramic additive, for example, a transition metal oxide or carbide, a rare earth element, magnesium (Mg), aluminum (Al), or the like, may be used.

The first and second internal electrodes 121 and 122, which are electrodes applied with different polarities, may be alternately disposed to face each other in the Z direction with respective dielectric layers 111 interposed, and one ends of the first and second internal electrodes 121 and 122 may be exposed to the third and fourth surfaces 3 and 4 of the capacitor body 110, respectively.

Here, the first and second internal electrodes 121 and 122 may be electrically insulated from each other by the dielectric layer 111 disposed therebetween.

End portions of the first and second internal electrodes 121 and 122 alternately exposed to the third and fourth surfaces 3 and 4 of the capacitor body 110 as described above may be electrically connected to first and second external electrodes 131 and 132 disposed on the third and fourth surfaces 3 and 4 of the capacitor body 110 to be described below.

Here, the first and second internal electrodes 121 and 122 may be formed of a conductive metal, for example, a material such as nickel (Ni), a nickel (Ni) alloy, or the like. However, materials of the first and second internal electrodes 121 and 122 are not limited thereto.

According to the configuration as described above, when predetermined voltages are applied to the first and second external electrodes 131 and 132, electric charges may be accumulated between the first and second internal electrodes 121 and 122 facing each other.

Here, capacitance of the electronic component 100 may be in proportion to an overlapping area between the first and second internal electrodes 121 and 122 overlapping each other in the Z direction.

The first and second external electrodes 131 and 132 may be formed on both ends of the capacitor body 110 in the X direction, provided with voltages having different polarities, respectively, and electrically connected to the exposed end portions of the first and second internal electrodes 121 and 122, respectively.

If necessary, plating layers may be further formed on surfaces of the first and second external electrodes 131 and 132 as described above.

For example, the first and second external electrodes 131 and 132 may include first and second conductive layers, first and second nickel (Ni) plating layers formed on the first and second conductive layers, and first and second tin (Sn) plating layers formed on the first and second nickel (Ni) plating layers, respectively.

The first external electrode 131 may include a first connection portion 131a and a first band portion 131b.

The first connection portion 131a may be a portion formed on the third surface 3 of the capacitor body 110 and electrically connected to the exposed end portions of the first internal electrode 121, and the first band portion 131b may be a portion extending from the first connection portion 131a to a portion of the first surface 1, the mounting surface, of the capacitor body 110 to thereby be connected to the first connection terminal 140.

Here, if necessary, the first band portion 131b may also extend to portions of the second surface 2 and fifth and sixth surfaces 5 and 6 of the capacitor body 110 for the purpose of improving adhesion strength, or the like.

The second external electrode 132 may include a second connection portion 132a and a second band portion 132b.

The second connection portion 132a may be a portion formed on the fourth surface 4 of the capacitor body 110 and electrically connected to the exposed end portions of the second internal electrode 122, and the second band portion 132b may be a portion extending from the second connection portion 132a to a portion of the first surface 1, the mounting surface, of the capacitor body 110 to thereby be connected to the second connection terminal 150.

Here, if necessary, the second band portion 132b may also extend to portions of the second surface 2 and fifth and sixth surfaces 5 and 6 of the capacitor body 110 for the purpose of improving adhesion strength, or the like.

In the present exemplary embodiment, the first and second connection terminals 141 and 142 may be disposed to correspond to the first and second band portions 131b and 132b of the first and second external electrodes 131 and 132 formed on the first surface 1, the mounting surface, of the capacitor body 110, respectively.

Therefore, the first and second connection terminals 141 and 142 may be electrically connected to the first and second band portions 131b and 132b of the first and second external electrodes 131 and 132, respectively.

Here, the first and second connection terminals 141 and 142 and the first and second external electrodes 131 and 132 may be adhered to each other by a solder or conductive paste, respectively.

If necessary, plating layers may be formed on surfaces of the first and second connection terminals 141 and 142 as described above.

The plating layer may contain tin (Sn), gold (Au), or the like.

Further, the first and second cut portions 141a and 142a may be formed on surfaces of the first and second connection terminals 141 and 142 facing each other in the X direction of the capacitor body 110, respectively. Therefore, the first and second connection terminals 141 and 142 may be formed, for example, in a shape such as open and close brackets ([,]), respectively. The first and second cut portions 141a and 142a may be recesses or grooves in the surfaces of the first and second connection terminals 141 and 142 facing each other in the X direction of the capacitor body 110, respectively.

Therefore, first and second solder accommodating portions 143 and 144 may be provided on the first and second external electrodes 131 and 132 by the first and second cut portions 141a and 141b, respectively, toward the first surface, the mounting surface, of the capacitor body 110.

Since the first and second cut portions 141a and 142a may serve as solder pockets in which solder used at the time of mounting the electronic component according to the present exemplary embodiment on a board, or the like, is accommodated, the first and second cut portions 141a and 142a may prevent the solder from being formed toward the upper surface of the capacitor body 110 to decrease a height of the solder, thereby suppressing vibrations of the capacitor body 110 from being transferred to the board to decrease acoustic noise.

Meanwhile, a maximum piezoelectric vibration occurs in a central portion of an X-Y plane of the capacitor body.

In the present exemplary embodiment, an adhesion area between a point at which the maximum piezoelectric vibration occurs in the central portion of the X-Y plane of the capacitor body 110 and the connection terminal may be decreased by the first and second cut portions 141a and 142a, such that the transferring of vibrations at the corresponding point may be decreased, and thus, acoustic noise may be further decreased.

Meanwhile, a core material of the first and second connection terminals 141 and 142 may be a metal or an insulating material, for example, a PCB material such as FR4 and F-PCB, a ceramic material such as alumina.

Here, when the first and second connection terminals 141 and 142 are formed of the insulating material, the first and second connection terminals 141 and 142 may have conductor land patterns electrically connected on upper and lower surfaces thereof so as to be connected the first and second external electrodes 131 and 132, respectively. The land patterns as described above may serve as a signal terminal and a ground (GND) terminal.

More specifically, the first connection terminal 141 according to the present exemplary embodiment may include a first land pattern formed on a surface of the first connection terminal 141 facing the first external electrode 131, a second land pattern formed on a surface thereof opposing the first land pattern, and a first conductive pattern formed on at least a portion of a surface thereof connecting the first and second land patterns to each other.

Further, the second connection terminal 142 may include a third land pattern formed on a surface of the second connection terminal 142 facing the second external electrode 132, a fourth land pattern formed on a surface thereof opposing the third land pattern, and a second conductive pattern formed on at least a portion of a surface thereof connecting the third and fourth land patterns to each other.

Therefore, the first and second land patterns on the upper and lower surfaces of the first connection terminal 141 described above may be electrically connected to each other through the first conductive pattern, and the third and fourth land patterns on the upper and lower surfaces of the second connection terminal 142 described above may be electrically connected to each other through the second conductive pattern.

Figure 5:
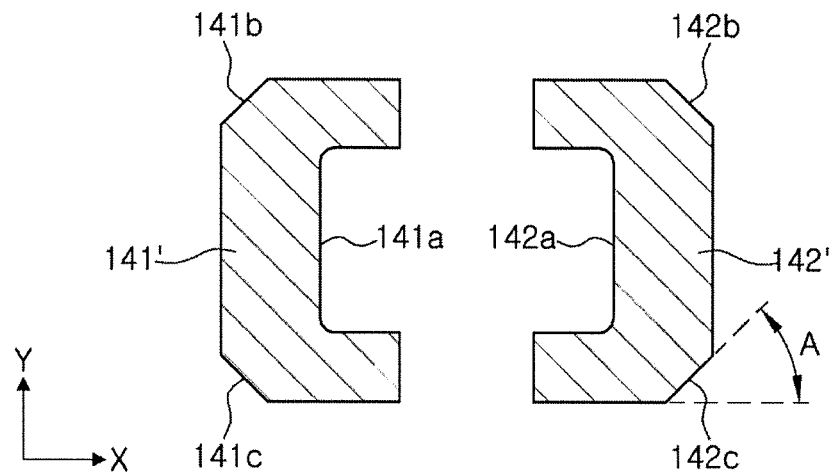
FIG. 5 is a bottom view illustrating first and second connection terminals according to another exemplary embodiment in the present disclosure.

FIG. 5 is a bottom view illustrating first and second connection terminals according to another exemplary embodiment in the present disclosure.

Referring to FIG. 5, one or more third cut portions 141b and 141c may be provided in a first connection terminal 141' according to another exemplary embodiment in the present disclosure.

Here, the third cut portions 141b and 141c may be formed by cutting one or more outer corners of the first connection terminal 141'. Thus, a surface of the first connection terminal 141' opposing the surface of the first connection terminal 141' having the first cut portion 141a in the X direction, and side surfaces of the first connection terminal 141' opposing each other in the Y direction, may be intersect by and connected by surfaces of the third cut portions 141b and 141c, respectively. The surfaces of the third cut portions 141b and 141c and the side surfaces of the first connection terminal 141' opposing each other in the Y direction may be inclined with each other and have an angle A (0°<A<90°) therebetween.

Further, one or more fourth cut portions 142b and 142c may be provided in a second connection terminal 142'.

Here, the fourth cut portions 142b and 142c may be formed by cutting one or more outer corners of the second connection terminal 142'. Thus, a surface of the second connection terminal 142' opposing the surface of the second connection terminal 142' having the second cut portion 142a in the X direction, and side surfaces of the second connection terminal 142' opposing each other in the Y direction, may be intersect by and connected by surfaces of the fourth cut portions 142b and 142c, respectively. The surfaces of the fourth cut portions 142b and 142c and the side surfaces of the second connection terminal 142' opposing each other in the Y direction may be inclined with each other and have an angle A (0°<A<90°) therebetween.

In addition, although a case in which the third cut portions 141b and 141c and the fourth cut portions 142b and 142c are inclined surfaces is illustrated in the present exemplary embodiment, the third cut portions 141b and 141c and the fourth cut portions 142b and 142c are not limited thereto. If necessary, the third and fourth cut portions may be formed to be curved. In this case, the surface of the first connection terminal 141' opposing the surface of the first connection terminal 141' having the first cut portion 141a in the X direction, and the side surfaces of the first connection terminal 141' opposing each other in the Y direction, may be connected by each other by curved side surfaces, respectively. The surface of the second connection terminal 142' opposing the surface of the second connection terminal 142' having the second cut portion 142a in the X direction, and the side surfaces of the second connection terminal 142' opposing each other in the Y direction, may be connected by each other by curved side surfaces, respectively.

Figure 6:
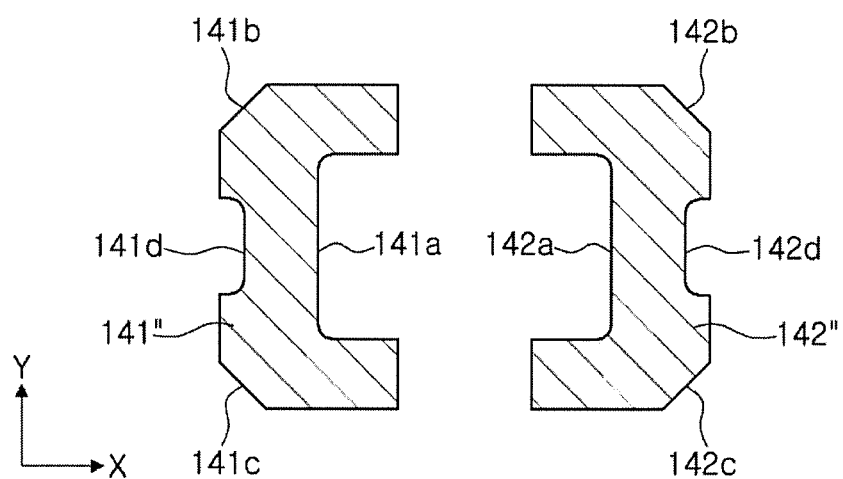
FIG. 6 is a bottom view illustrating first and second connection terminals according to another exemplary embodiment in the present disclosure.

FIG. 6 is a bottom view illustrating first and second connection terminals according to another exemplary embodiment in the present disclosure.

Referring to FIG. 6, at least one fifth cut portion 141d may be provided in a first connection terminal 141" according to another exemplary embodiment in the present disclosure.

Further, at least one sixth cut portion 142d may be provided in a second connection terminal 142".

Here, the fifth and sixth cut portions 141d and 142d may be formed by partially cut surfaces of the first and second connection terminals 141" and 142" opposing each other in the X direction of the capacitor body 110. The fifth and sixth cut portions 141d and 142d may be recesses or grooves in the surfaces of the first and second connection terminals 141" and 142" opposing each other in the X direction of the capacitor body 110, respectively.

Therefore, an adhesion area between connection terminals and external electrodes may be decreased as compared to the above-mentioned exemplary embodiment, but areas of solder accommodating portions may be further increased, such that formation of a solder fillet may be further suppressed at the time of mounting the electronic component on a board. Therefore, acoustic noise may be further decreased.

When voltages having different polarities are applied to the first and second external electrodes 131 and 132 formed on the electronic component in a state in which the electronic component 100 is mounted on a board, the capacitor body 110 may be expanded and contracted in the Z direction due to an inverse piezoelectric effect of the dielectric layers 111, and both end portions of the first and second external electrodes 131 and 132 may be contracted and expanded as opposed to the expansion and the contraction of the capacitor body 110 in the Z direction due to a Poisson effect.

This contraction and expansion may generate vibrations. In addition, the vibrations may be transferred from the first and second external electrodes 131 and 132 to the board. Therefore, sound may be radiated from the board, which becomes the acoustic noise.

Here, solder formed between the first and second external electrodes 131 and 132 of the electronic component and first and second pads formed on one surface of the board may be formed toward the second surface 2 of the capacitor body 110 to have a predetermined height, such that the vibrations generated from the electronic component 100 may be significantly transferred to the board.

However, in the present exemplary embodiment, piezoelectric vibrations transferred to the board through the first and second external electrodes 131 and 132 of the electronic component may be absorbed due to elasticity of the first and second connection terminals 141 and 142, such that acoustic noise may be decreased.

Further, first and second solder accommodating portions provided by the first and second cut portions 141a and 142a of the first and second connection terminals 141 and 142, respectively, may serve as the solder pockets that may trap the solder on the first surface of the capacitor body 110.

Therefore, a piezoelectric vibration transfer path of the electronic component 100 may be blocked, and the solder fillets and a maximum displacement point in the capacitor body 110 may be spaced apart from each other, such that an acoustic noise decreasing effect may be significantly improved as compared to an electronic component according to the related art.

According to the present exemplary embodiment, a vibration amount of the piezoelectric vibrations of the multilayer electronic component transferred to the board at an audio frequency within 20 kHz of the multilayer electronic component may be effectively suppressed by an acoustic noise decreasing structure described above.

Therefore, high frequency vibrations of the multilayer electronic component may be decreased to prevent malfunctions of sensors that may be caused by high frequency vibrations of 20 kHz or more of the electronic component in information technology (IT) or industry/electrical component fields, and accumulation of internal fatigue of the sensors due to vibrations for a long period of time may be suppressed.

As set forth above, according to exemplary embodiments in the present disclosure, acoustic noise of the multilayer electronic component in an audio frequency region of 20 kHz or less and a high-frequency vibration of 20 kHz or more may be decreased.

While exemplary embodiments have been shown and described above, it will be apparent to those skilled in the art that modifications and variations could be made without departing from the scope of the present invention as defined by the appended claims.

What is claimed is:
1. An electronic component comprising:
a capacitor body;
first and second external electrodes disposed on both ends of the capacitor body in a length direction; and
first and second connection terminals disposed on a mounting surface of the capacitor body and connected to the first and second external electrodes, respectively, and having first and second cut portions on surfaces facing each other in the length direction of the capacitor body, respectively,
wherein the first cut portion is recessed, in a direction away from the second connection terminal, from first and second portions of the surface of the first connection terminal, the first cut portion being disposed between the first and second portions,
the second cut portion is recessed, in a direction away from the first connection terminal, from third and fourth portions of the surface of the second connection terminal, the second cut portion being disposed between the third and fourth portions,
the first cut portion extends through the first connection terminal from an upper surface of the first connection terminal to a lower surface of the first connection terminal, the upper surface of the first connection terminal facing the capacitor body, the second cut portion extends through the second connection terminal from an upper surface of the second connection terminal to a lower surface of the second connection terminal, the upper surface of the second connection terminal facing the capacitor body, the lower surface of the first connection terminal and the lower surface of the second connection terminal constitute a mounting surface of the electronic component, the first connection terminal includes an insulating material, and includes a first land pattern disposed on the upper surface of the first connection terminal, a second land pattern disposed on the lower surface of the first connection terminal, and a first conductive pattern disposed on at least a portion of a surface thereof connecting the first and second land patterns to each other and connecting the first and second land patterns to each other, and the second connection terminal includes the insulating material, and includes a third land pattern disposed on the upper surface of the second connection terminal, a fourth land pattern disposed on the lower surface of the second connection terminal, and a second conductive pattern disposed on at least a portion of a surface thereof connecting the third and fourth land patterns to each other and connecting the third and fourth land patterns to each other.

2. The electronic component of claim 1, wherein a third cut portion is further provided in one or more outer corners of the first connection terminal, and a fourth cut portion is further provided in one or more outer corners of the second connection terminal.

3. The electronic component of claim 1, wherein one or more fifth and sixth cut portions are further provided in surfaces of the first and second connection terminals opposing each other in the length direction of the capacitor body, respectively.

4. The electronic component of claim 1, wherein first and second solder accommodating portions are provided on the first and second external electrodes toward the mounting surface of the capacitor body by the first and second cut portions, respectively.

5. The electronic component of claim 1, wherein the first and second connection terminals include a metal.

6. The electronic component of claim 1, further comprising plating layers disposed on surfaces of the first and second external electrodes.

7. The electronic component of claim 1, further comprising plating layers disposed on surfaces of the first and second connection terminals.

8. The electronic component of claim 1, wherein the capacitor body includes a plurality of dielectric layers and a plurality of first and second internal electrodes alternately disposed with respective dielectric layers interposed therebetween and has first and second surfaces opposing each other and third and fourth surfaces connected to the first and second surfaces and opposing each other in the length direction, and one ends of the first and second internal electrodes are exposed to the third and fourth surfaces of the capacitor body, respectively.

9. The electronic component of claim 8, wherein the first and second external electrodes respectively include:

first and second connection portions disposed on the third and fourth surfaces of the capacitor body, respectively, and first and second band portions extending from the first and second connection portions to portions of the first surface of the capacitor body and connected to the first and second connection terminals, respectively.

* * * * *